United States Patent [19]

Kurcbart et al.

[11] Patent Number: 5,428,350
[45] Date of Patent: Jun. 27, 1995

[54] PIVOTABLE DISPLAY ARRANGEMENT FOR AN ELECTRONIC DEVICE

[75] Inventors: Robert Kurcbart, Boca Raton; William J. Scheid, Coral Springs, both of Fla.

[73] Assignee: Motorola, Inc., Schaumburg, Ill.

[21] Appl. No.: 143,706

[22] Filed: Nov. 1, 1993

Related U.S. Application Data

[63] Continuation-in-part of Ser. No. 937,090, Aug. 31, 1992, abandoned.

[51] Int. Cl.⁶ .............................................. G08B 5/22
[52] U.S. Cl. ........................... 340/825.44; D14/147
[58] Field of Search .............. 340/825.44, 815.49, 340/815.51, 815.86, 311.1, 693; 361/681, 755, 740; 455/344, 347, 348, 349, 351; 429/100, 98, 97; 206/45.15, 45.23; 345/126, 905; 379/56, 57, 434

[56] References Cited

U.S. PATENT DOCUMENTS

| | | | |
|---|---|---|---|
| D. 297,640 | 9/1988 | Hampf | D14/68 |
| D. 306,294 | 2/1990 | Watanabe | D14/148 |
| D. 319,441 | 8/1991 | Konno et al. | D14/147 |
| 4,230,777 | 10/1980 | Gatto | 429/97 |
| 4,272,591 | 6/1981 | Brander | 429/98 |
| 4,391,883 | 7/1983 | Williamson et al. | 429/97 |
| 4,578,739 | 3/1986 | McKee et al. | 361/740 |
| 5,027,394 | 6/1991 | Ono et al. | 379/434 |
| 5,363,089 | 11/1994 | Goldenberg | 340/825.44 |

FOREIGN PATENT DOCUMENTS 9013951  11/1990  WIPO ................... 455/349

OTHER PUBLICATIONS

Hewlett-Packard Company, "HP95LX Palmtop PC", cover pp. 1, 18, Jan. 1992, USA.

*Primary Examiner*—Donald J. Yusko
*Assistant Examiner*—Edwin C. Holloway, III
*Attorney, Agent, or Firm*—R. Louis Breeden

[57] ABSTRACT

A pivotable display arrangement for an electronic device (600) powered by a battery (116) includes an enclosure (102, 104) having sides formed to provide an arcuate rectangular aperture (602) spanning across a portion of the top and front of file enclosure (102, 104). A pivotable display positioned within the aperture 602 includes a display element (112) attached to a display housing (110) formed in a cylindrical shape such that an interior portion provides a battery compartment (109). First and second bearings (1102) are formed in the enclosure (102, 104) at opposing sides of the aperture 602 for capturing first and second ends (1104) of the display housing (110), thereby allowing rotation of the display housing (110) about a central axis (111) through the first and second bearings (1102).

19 Claims, 7 Drawing Sheets

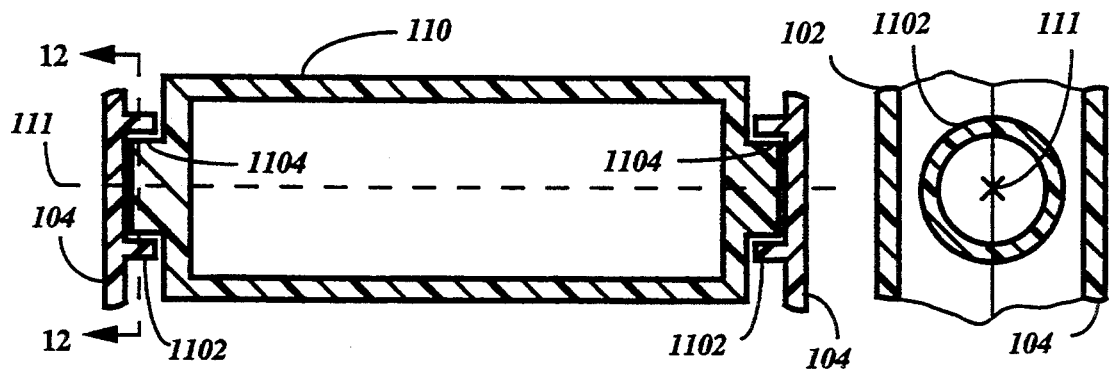
FIG. 11  FIG. 12
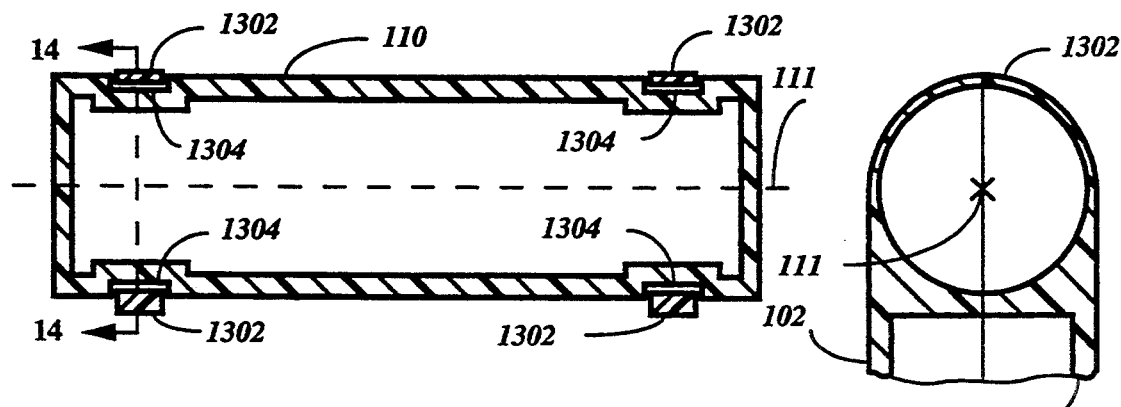
FIG. 13  FIG. 14
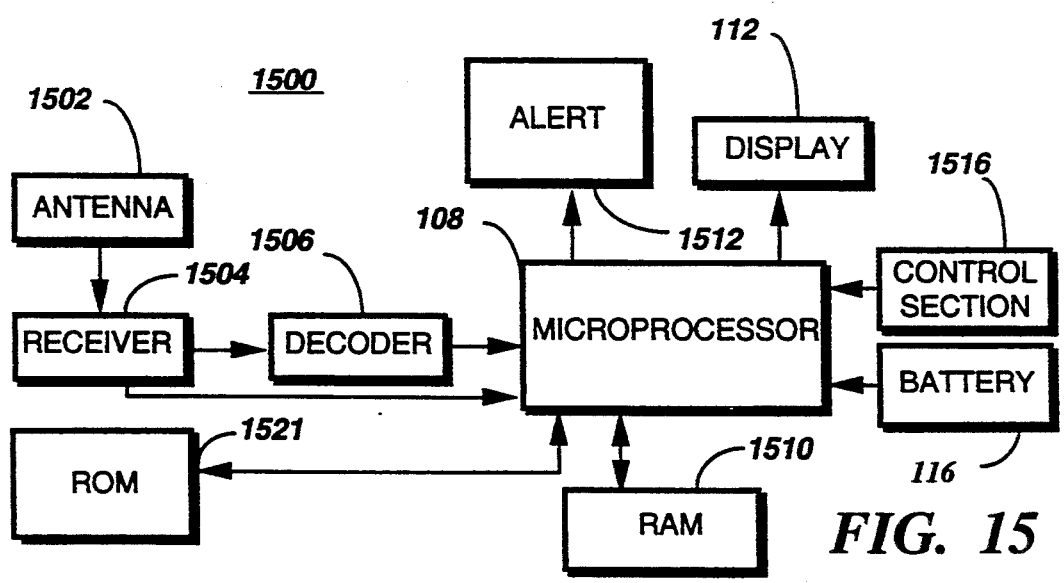
FIG. 15

PIVOTABLE DISPLAY ARRANGEMENT FOR AN ELECTRONIC DEVICE

This is a continuation-in-part of U.S. patent application Ser. No. 07/937,090, filed Aug. 31, 1992 by Kurcbart et al., entitled "Pivotable Display Head for an Electronic Device" now abandoned.

FIELD OF THE INVENTION

This invention relates in general to apparatus for mounting displays for electronic devices, and more specifically to apparatus for mounting the displays in a movable, manner.

BACKGROUND OF THE INVENTION

Portable, battery powered electronic devices having a display for displaying information are well-known in the art. While some types of portable devices, for example, laptop computers and some calculators, have been designed with displays having various movable arrangements for obtaining a preferred viewing angle, the range of movement of the display has generally been limited to a range suitable for desktop or laptop use. Also, such devices with movable displays typically were designed for use while seated quietly, rather than while walking about, so the displays typically did not have a very rigorous design to prevent inadvertent repositioning of the display during use.

Other types of portable devices having a display for displaying messages and intended for use while moving about, e.g., selective call receivers, were read in a variety of positions, e.g., hand-held, set on a desktop, or worn clipped to one's clothing. They also were used during a variety of activities ranging from sleeping to playing handball. For this reason such devices were manufactured with a fixed display either on the front of the device for users who preferred to read the messages in hand-held or desktop positions, or on the top of the device for users who preferred to read the messages while leaving the device clipped to their clothing.

Movable displays such as the hinged, flat displays used on conventional laptop computers are not suitable for devices like selective call receivers, which must survive periods of highly active use without repositioning or damage. Still, there are many users who sometimes prefer the hand-held or desktop reading positions and at other times prefer to read the device while worn. For these users, neither a front-mounted display nor a top-mounted display is completely satisfactory all the time.

Thus, what is needed is an apparatus that overcomes the limitations of the conventional top-mounted and front-mounted displays, while retaining the advantages of each. Also, because a portable device is sometimes worn attached to one's clothing, the apparatus preferably will add little or no volume to the portable device. In addition, because of the possibility of highly active use while being worn, the apparatus must not be compromised or damaged by active use.

SUMMARY OF THE INVENTION

One aspect of the present invention is a pivotable display arrangement for an electronic device including circuitry powered by a battery. The pivotable display arrangement includes an enclosure for protecting and enclosing the electronic device. The enclosure comprises sides formed to provide an arcuate rectangular aperture spanning across a contiguous portion of top and front enclosure surfaces. The pivotable display arrangement also includes a pivotable display disposed within the arcuate rectangular aperture, comprising a display element electrically coupled to the circuitry for displaying information provided by the circuitry, and a display housing attached to the display element and formed in a substantially cylindrical shape such that an interior portion of the display housing forms a battery compartment for containing the battery. The pivotable display arrangement further includes first and second bearings formed in the enclosure at opposing sides of the arcuate rectangular aperture for rotatably attaching the display housing to the enclosure. The first and second bearings rotatably capture first and second ends of the display housing, thereby allowing rotation of the display housing to a plurality of predetermined positions about a central axis through the first and second bearings.

Another aspect of the present invention is a selective call receiver powered by a battery. The selective call receiver comprises a printed circuit board including circuitry for receiving and decoding selective call messages, and an enclosure coupled to the printed circuit board for protecting and enclosing the circuitry. The enclosure comprises sides formed to provide an arcuate rectangular aperture spanning across a contiguous portion of top and front enclosure surfaces. The selective call receiver also includes a pivotable display disposed within the arcuate rectangular aperture, comprising a display element electrically coupled to the circuitry for displaying the selective call messages provided by the circuitry, and a display housing attached to the display element and formed in a substantially cylindrical shape such that an interior portion of the display housing forms a battery compartment for containing the battery. The selective call receiver further includes first and second bearings formed in the enclosure at opposing sides of the arcuate rectangular aperture for rotatably attaching the display housing to the enclosure. The first and second bearings rotatably capture first and second ends of the display housing, thereby allowing rotation of the display housing to a plurality of predetermined positions about a central axis through the first and second bearings.

Brief Description of the Drawings

FIG. 11 is an orthographic cross-section front view of portions of the pivotable display and enclosure detailing a bearing in accordance with the preferred embodiment of the present invention.

FIG. 12 is an orthographic cross-section side view of first and second enclosure sections along the line 12—12, detailing the bearing in accordance with the preferred embodiment of the present invention.

FIG. 13 is an orthographic cross-section front view of portions of the pivotable display and enclosure detailing a bearing in accordance with the second alternative embodiment of the present invention.

FIG. 14 is an orthographic cross-section side view of first and second enclosure sections along the line 14—14, detailing the bearing in accordance with the second alternative embodiment of the present invention.

FIG. 15 is an electrical block diagram of the selective call receiver in accordance with the preferred and alternative embodiments of the present invention.

DESCRIPTION OF THE PREFERRED EMBODIMENT

Figure 1:
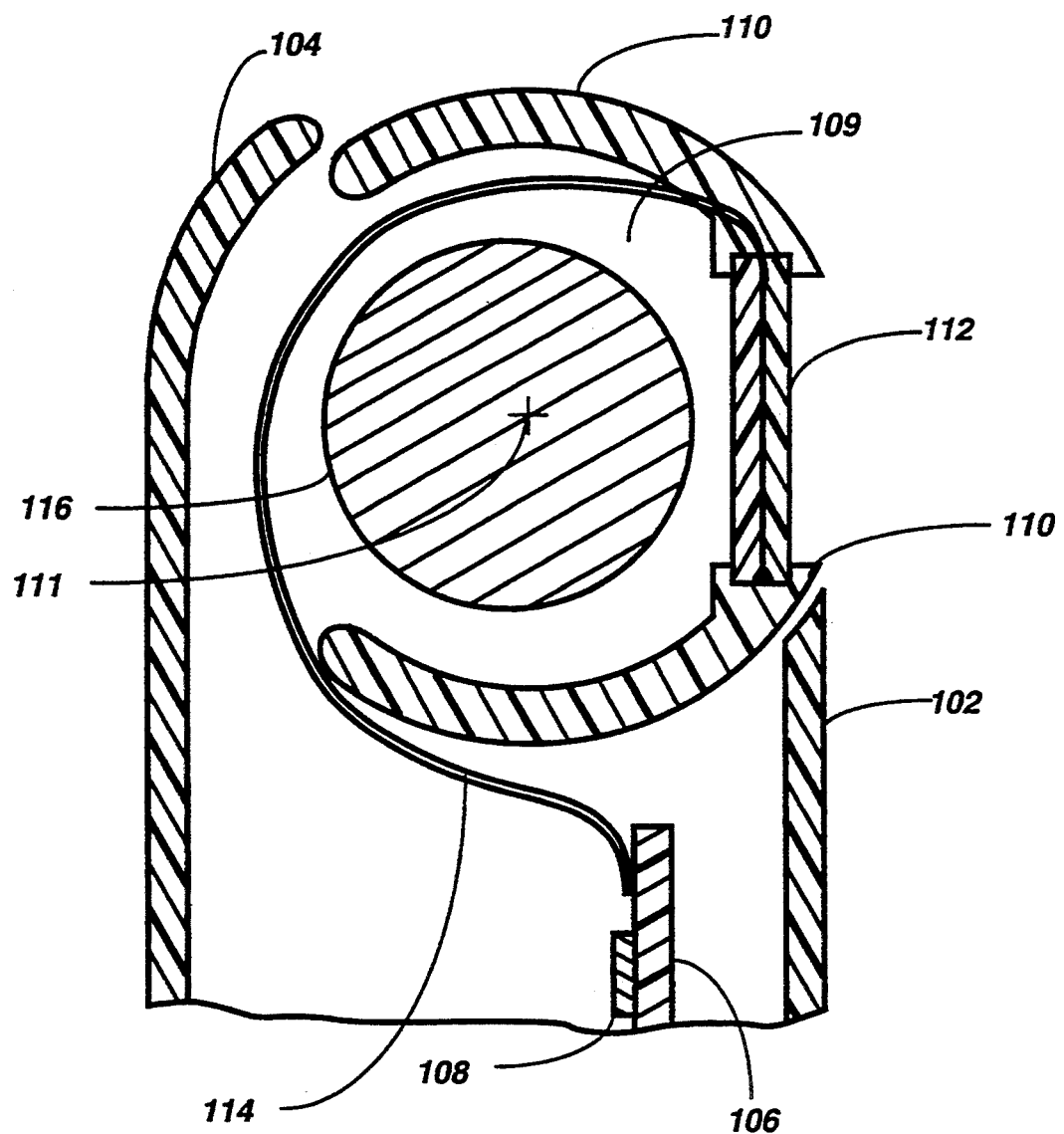
FIG. 1 is an orthographic cross-section side view of a central portion of a selective call receiver depicting a pivotable display rotated to a front position in accordance with the preferred embodiment of the present invention.

With reference to FIG. 1, an orthographic cross-section side view shows a portion of a selective call receiver 600 (FIG. 6) comprising a pivotable display rotated to a front facing position in accordance with the preferred embodiment of the present invention. The pivotable display comprises a display housing 110 and a display element 112, preferably a conventional liquid crystal display (LCD), mechanically coupled to the display housing 110. The front facing position shown is advantageous for a user who wishes to use the selective call receiver 600 in a hand-held position, for example.

The selective call receiver 600 further includes an enclosure comprising a first enclosure section 102 mechanically coupled to a second enclosure section 104 for enclosing and protecting a conventional printed circuit board 106 comprising selective call receiver circuitry, e.g., a microprocessor 108, such as the MC68HC05, C08, or C11 series microcomputers manufactured by Motorola, Inc. of Schaumburg, Ill. The first and second enclosure sections 102, 104 are mechanically coupled to the display housing 110 having a substantially cylindrical shape, the mechanical coupling allowing the display housing 110 to rotate with respect to the first and second enclosure sections 102, 104 about a central axis 111, as will be described herein below. The walls of the display housing 110 are constructed such that they form a compartment 109 large enough to contain a battery 116 for powering the selective call receiver 600. The material used to construct the first and second enclosure sections 102, 104 and the display housing 110 is preferably an injection molded polycarbonate plastic. Other moldable plastic materials may be used as well.

The display element 112 for displaying information supplied from the microprocessor 108 is electrically coupled with the printed circuit board 106 by a conventional flexible connector 114. The flexibility and length of the flexible connector 114 are such that the display element 112 can rotate with the display housing 110 while maintaining circuit continuity between the display element 112 and the printed circuit board 106. The flexible connector 114 also preferably provides electrical coupling between the battery 116 and the printed circuit board 106 for supplying power to the selective call receiver 600.

An alternative embodiment of the pivotable display omits locating the battery 116 within the compartment 109. In some electronic devices it may the advantageous to place electronic circuits, e.g., display driver circuits, into the compartment 109, while locating the battery 116 elsewhere within the electronic device. This would be done, for example, to allow a simple serial interface between the pivotable display and the printed circuit board 106 to reduce the required number of electrical interconnections within the flexible connector 114.

Figure 2:
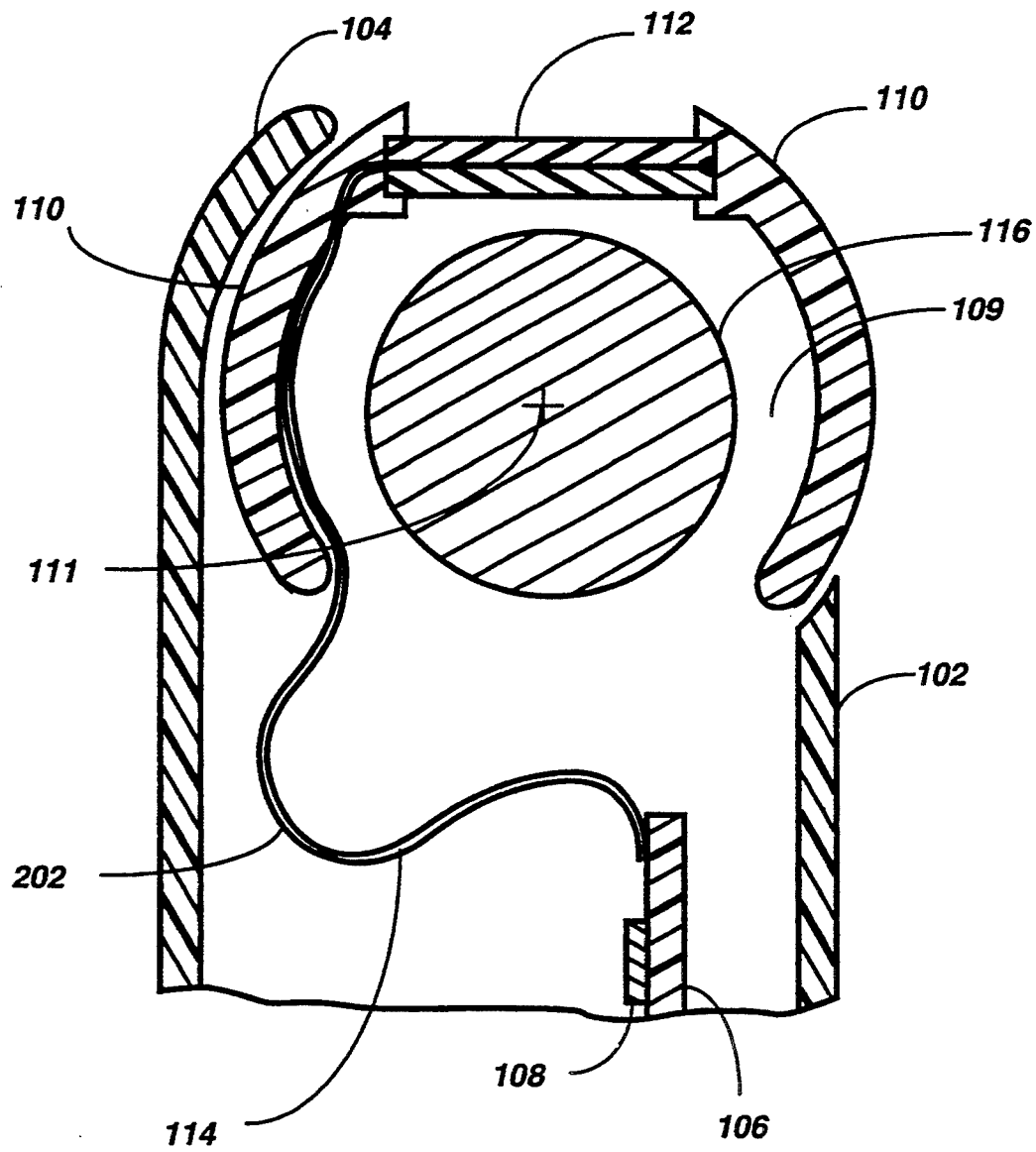
FIG. 2 is an orthographic cross-section side view of the central portion of the selective call receiver depicting the pivotable display rotated to a top position in accordance with the preferred embodiment of the present invention.

With reference to FIG. 2, an orthographic cross-section side view is similar to FIG. 1, the essential difference being that the pivotable display is depicted rotated to a top facing position. The top facing position is advantageous for a user who wears the selective call receiver 600 on a belt, for example. Also in FIG. 2 the flexible connector 114 is shown with a loop of slack 202 resulting from the shortened distance between the display element 112 and the printed circuit board 106 when the pivotable display is in the top facing position.

Figure 3:
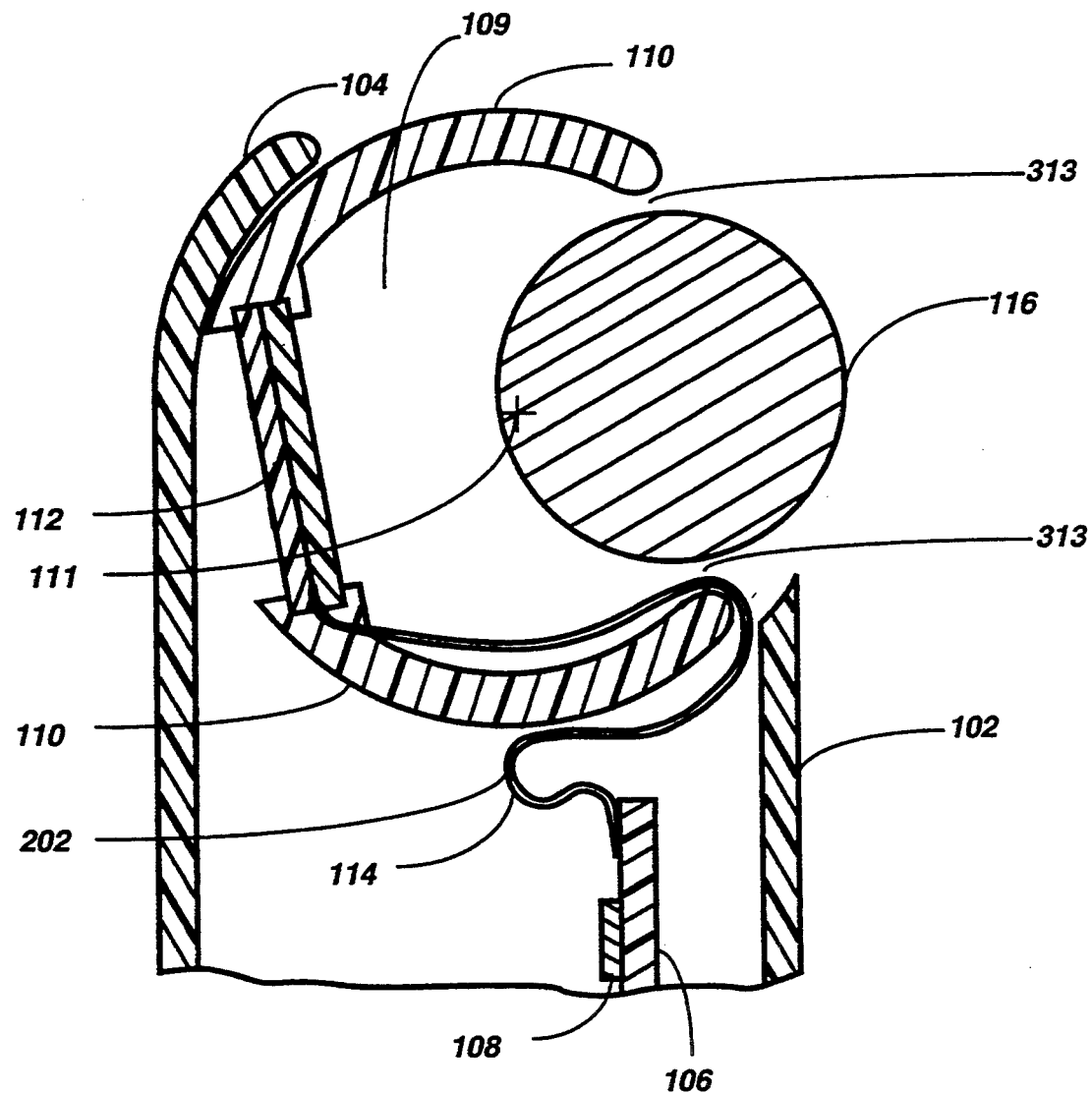
FIG. 3 is an orthographic cross-section side view of the central portion of the selective call receiver depicting the pivotable display rotated to a battery installation and removal position in accordance with the preferred embodiment of the present invention.

With reference to FIG. 3, an orthographic cross-section side view is similar to FIGS. 1 and 2, the essential difference being that the pivotable display is depicted rotated to a battery installation and removal position. Also in FIG. 3 the battery 116 is depicted partially removed from the compartment 109 to indicate how the battery 116 can pass through a substantially rectangular aperture 313 formed in the wall of the display housing 110, when the pivotable display is rotated to the battery installation and removal position. Also, in FIG. 3 the loop of slack 202 in the flexible connector 114 is reduced compared to FIG. 2, because of the somewhat greater length required to couple the display element 112 to the printed circuit board 106 in the battery installation and removal position.

Figure 4:
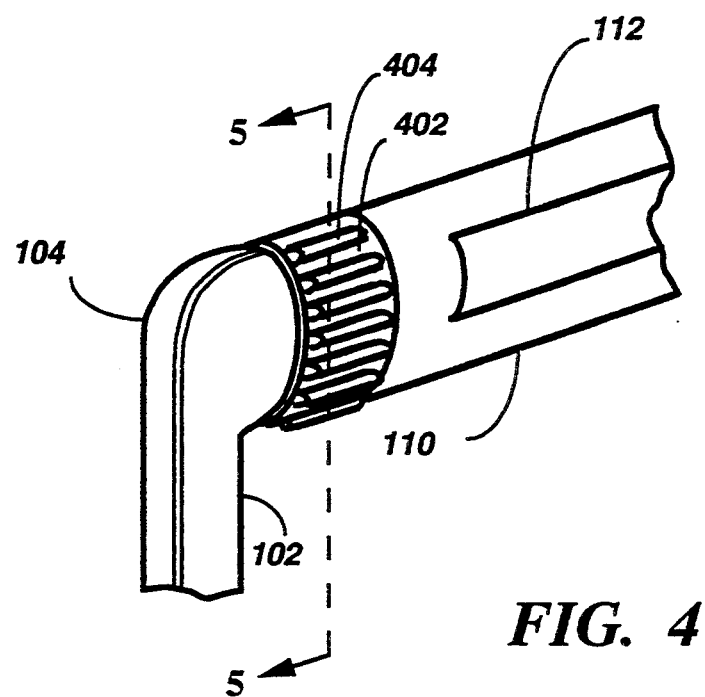
FIG. 4 is an isometric view of the upper left portion of the selective call receiver depicting the pivotable display coupled to a knurled band in accordance with the preferred embodiment of the present invention.

With reference to FIG. 4, an isometric view of a portion of the selective call receiver 600 depicting the pivotable display coupled to a knurled band 402 in accordance with the preferred embodiment of the present invention depicts the first and second enclosure sections 102, 104, the display housing 110, and the display element 112. The knurled band 402 comprises a plurality of protrusions 404 that provide a convenient means for a user to rotate the pivotable display to a desired position. It will be appreciated that indentations may be used instead of the protrusions 404 to facilitate rotation.

Figure 5:
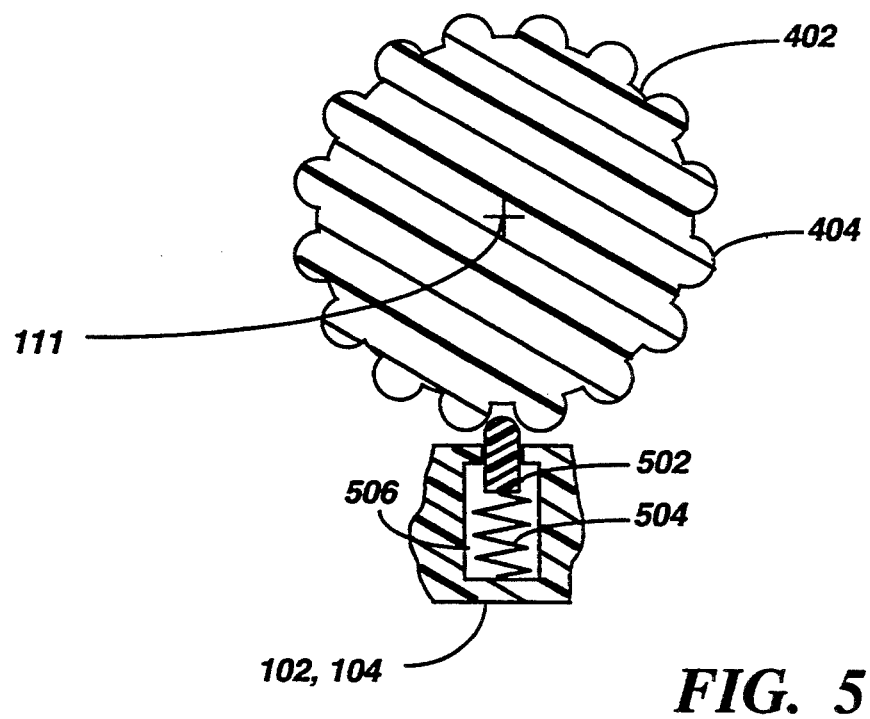
FIG. 5 is an orthographic cross-section side view along the line 5—5 of the knurled band coupled to a spring-loaded detent system in accordance with the preferred embodiment of the present invention.

With reference to FIG. 5, an orthographic cross-section side view along the line 5—5 (FIG. 4) of the knurled band 402 and a portion of the enclosure 102, 104 shows the knurled band 402 coupled to a spring-loaded detent system in accordance with the preferred embodiment of the present invention. The spring-loaded detent system comprises a movable detent 502, which is held in mechanical contact with the knurled band 402 by a spring 504 to provide position retention to the pivotable display, as described herein below. The movable detent 502 and the spring 504 are enclosed by an alignment chamber 506 preferably molded into either the first or second enclosure sections 102, 104 (FIG. 1) for aligning the movable detent 502 and the spring 504, and for forcibly holding the rounded end of the movable detent 502 against the knurled band 402. The shape of the movable detent 502 and the alignment chamber 506 preferably is substantially cylindrical, although other shapes could be used as well. The material used to construct the knurled band 402, the movable detent 502, and the walls of the alignment chamber 506 is preferably an injection molded polycarbonate plastic. The spring 504 preferably is stainless steel. It will be appreciated that other similar materials may be used as well for knurled band 402, the movable detent 502, the walls of the alignment chamber 506, and the spring 504.

The physical arrangement of the knurled band 402 and the spring-loaded detent system 502, 504, 506 are such that when the knurled band 402 and the mechanically coupled display housing 110 are rotated about the central axis 111, the plurality of protrusions 404 move the movable detent 502 into and out of the alignment chamber 506 against the spring 504. At those points of rotation where one of the plurality of protrusions 404 is directly above the detent 502, the detent 502 is forced maximally into the alignment chamber 50,6 against the spring 504. At those points of rotation where the detent 502 is evenly between two of the plurality of protrusions 404 (as depicted in FIG. 5), the spring 504 forces the detent 502 to be maximally extended from the alignment chamber 506. Such rotational positions, where the detent 502 is maximally extended from the alignment chamber, comprise stable rotational positions for the knurled band 402 and thus for the mechanically coupled display housing 110. That is, the rotational positions where the detent 502 is evenly between two of the plurality of protrusions 404 comprise a plurality of predetermined positions to which the pivotable display may be adjusted with a reasonable expectation that the position will be retained. Of course, a user may readjust the pivotable display to a new one of the plurality of predetermined positions by applying a moderate rotational force to the knurled band 402.

Figure 6:
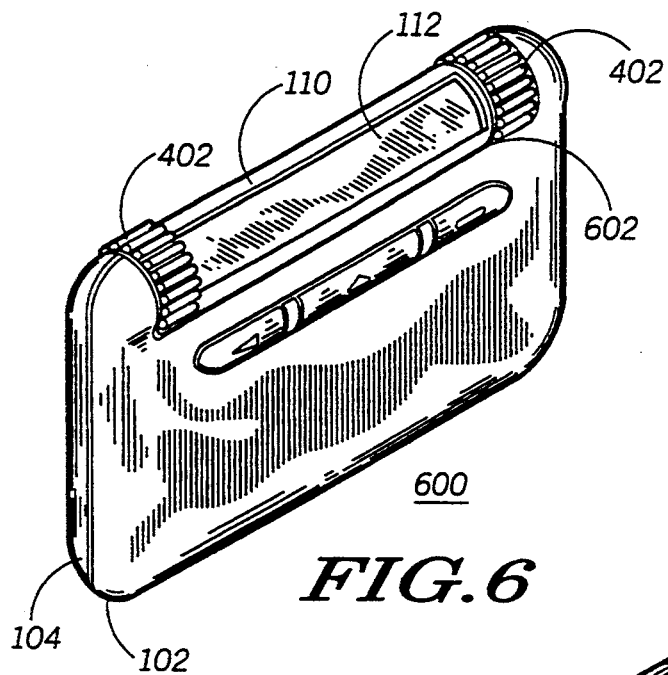
FIG. 6 is an isometric view of the selective call receiver having the pivotable display in accordance with the preferred embodiment of the present invention.

With reference to FIG. 6, an isometric view of the selective call receiver 600 having the pivotable display in accordance with the preferred embodiment of the present invention shows the display housing 110, the display element 112, and two knurled bands 402. The enclosure, comprising the first and second enclosure sections 102, 104, is formed to provide an arcuate rectangular aperture 602 spanning across a contiguous portion of the top and front enclosure surfaces for accommodating the display housing 110.

Figure 7:
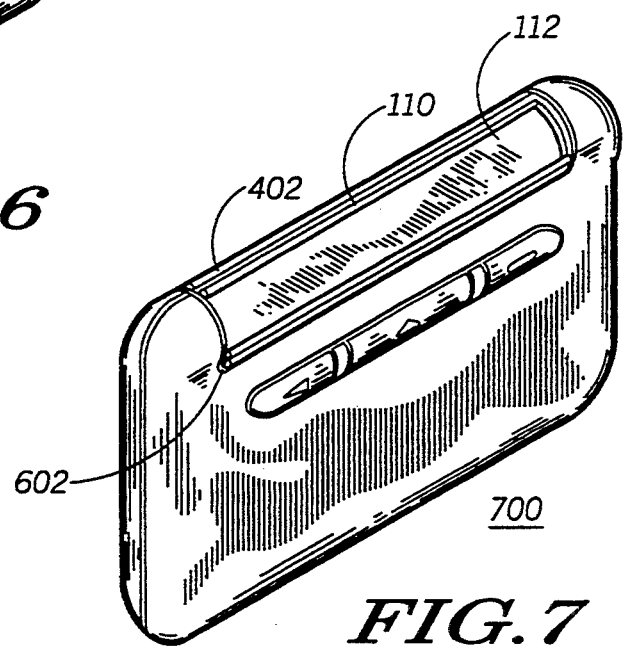
FIG. 7 is an isometric view of a selective call receiver having a pivotable display in accordance with a first alternative embodiment of the present invention.
Figure 8:
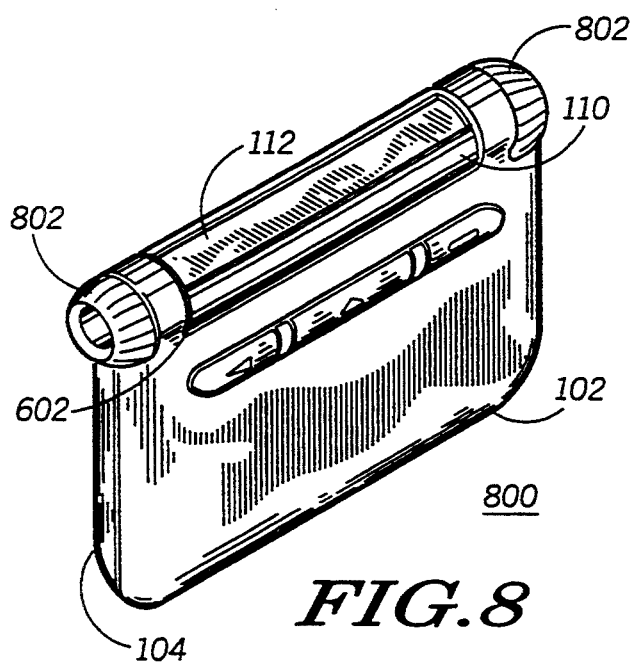
FIG. 8 is an isometric view of a selective call receiver having a pivotable display in accordance with a second alternative embodiment of the present invention.

With reference to FIGS. 7 and 8, isometric views of selective call receivers 700, 800 having a pivotable display in accordance with two alternative embodiments of the present invention are shown. In FIG. 7 the knurled band 402 extends substantially across the length of the display housing 110. This arrangement allows a slightly longer display area for a given selective call receiver width, but may be slightly more difficult for a user to readjust to a new position. In FIG. 8 the knurled band 402 is hidden within a portion of the first and second enclosure sections 102, 104 for interaction with the spring-loaded detent system 502, 504, 506, and then reappears as two knurled knobs 802 on either end of the display housing 110 for aiding position adjustment by a user, at the cost of a slightly wider selective call receiver 800.

Figure 9:
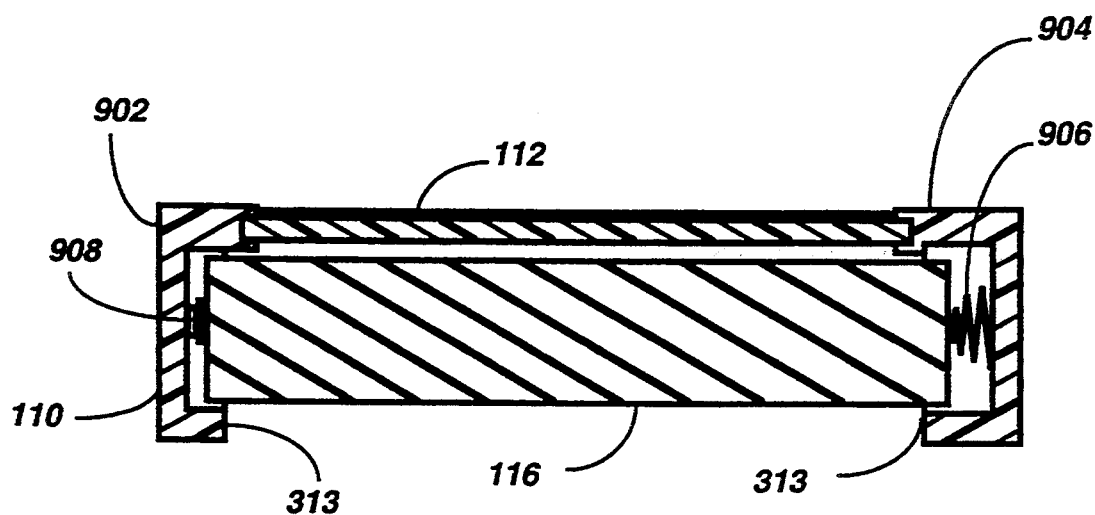
FIG. 9 is an orthographic cross-section top view of a portion of the pivotable display detailing a battery containment apparatus having a battery installed therein in accordance with the preferred embodiment of the present invention.

With reference to FIG. 9, an orthographic cross-section top view of a portion of the display housing 110 detailing a battery containment apparatus having the battery 116 installed therein in accordance with the preferred embodiment of the present invention depicts first and second battery retainment collars 902, 904. The first and second battery retainment collars 902, 904 preferably are molded into the display housing 110 such that they surround each end of the battery 116. The second battery retainment collar 904 comprises a battery contact spring 906, which provides electrical contact with one end of the battery 116 while forcing the opposite end of the battery 116 against a battery contact pad 908. The battery contact spring 906 also serves to keep the opposite end of the battery 116 within the first battery retainment collar 902 to hold the battery 116 in place during normal use of the selective call receiver 600. Preferably, the battery contact spring 906 and the battery contact pad 908 are coupled to the printed circuit board 106 by the flexible connector 114 for supplying power to the selective call receiver 600. Also, the battery contact spring 906 and the battery contact pad 908 preferably are constructed of stainless steel plated with gold over copper plating, although it will be appreciated that other similar conductive materials may be utilized as well for the spring 906 and pad 908.

Figure 10:
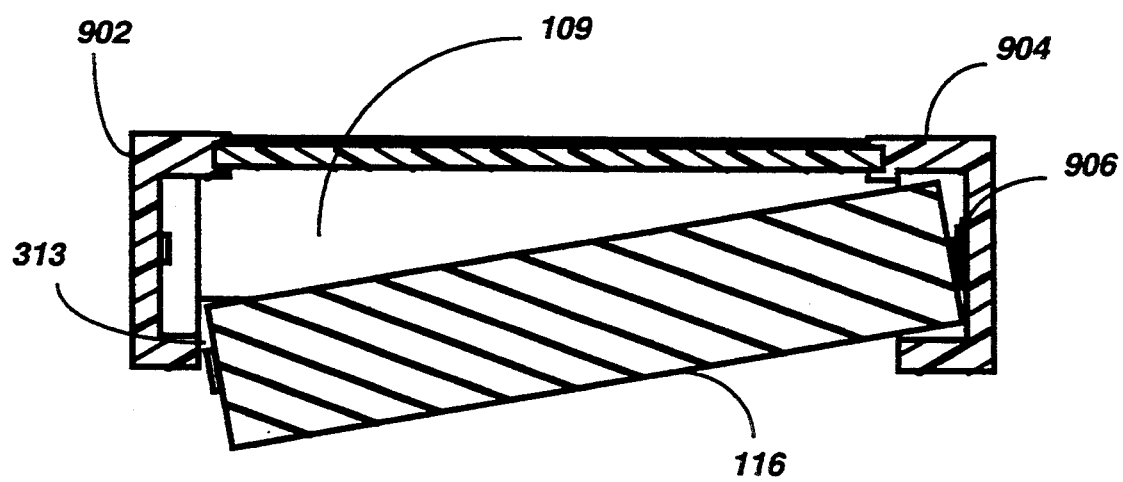
FIG. 10 is an orthographic cross-section top view of a portion of the pivotable display showing how the battery may be removed from or placed into the battery containment apparatus in accordance with the preferred embodiment of the present invention.

With reference to FIG. 10, an orthographic cross-section top view of the display housing 110 showing how the battery 116 may be removed from or placed into the battery containment apparatus in accordance with the preferred embodiment of the present invention shows the battery partially removed from the compartment 109. To remove the battery 116, a user first rotates the pivotable display to the battery installation and removal position, as shown in FIG. 3. Then the user may apply a moderate force to the battery 116 to move the battery 116 towards the second battery retainment collar 904, compressing the battery contact spring 906. The moderate force may be applied, for example, by pressure from the user's thumb placed against the battery 116. When the battery 116 has been moved far enough to clear the first battery retainment collar 902, the battery 116 may then be rotated through the aperture 313 and removed from the compartment 109. Removal of the battery may be facilitated by using a tool such as a screwdriver between the first battery retainment collar 902 and the battery 116 to help pry the battery 116 from the compartment 109.

To install the battery 116 the user inserts one end of the battery 116 into the second battery retainment collar 904, compressing the battery contact spring 906 enough for the opposite end of the battery 116 to clear the first battery retainment collar 902. The battery 116 is then rotated until it snaps into place within the first battery retainment collar 902, the battery being held in place by force from the compressed battery contact spring 906.

With reference to FIGS. 11 and 12, FIG. 11 is an orthographic cross-section front view of portions of the display housing 110 and enclosure section 104 depicting two bearings 1102 for rotatably capturing the ends 1104 of the display housing 110 in accordance with both the preferred and first alternative embodiments of the present invention. FIG. 12 is an orthographic cross-section side view of the first and second enclosure sections 102, 104 along the line 12—12 (FIG. 11) with the display housing 110 removed. When the first and second enclosure sections 102, 104 are assembled, the two bearings 1102 are formed on opposing sides of the arcuate rectangular aperture 602, one at either end of the display housing 110. The bearings 1102 comprise annular walls which engage a portion of the ends 1104 of the display housing 110, thereby allowing rotation of the display housing 110 about the central axis 111 through the bearings 1102.

With reference to FIGS. 13 and 14, FIG. 13 is an orthographic cross-section front view of portions of the display housing 110 depicting two bearings 1302 in accordance with the second alternative embodiment of the present invention. FIG. 14 is an orthographic cross-section side view of the first and second enclosure sections 102, 104 along the line 14—14 (FIG. 13) with the display housing 110 removed, depicting how the bearings 1302 are formed by the first and second enclosure sections 102, 104. When the first and second enclosure sections 102, 104 are assembled, the bearings 1302 are formed on opposing sides of the arcuate rectangular aperture 602 near each end of the display housing 110. As depicted in FIGS. 13 and 14, the bearings 1302 comprise annular bands which engage with corresponding annular depressions 1304 in the display housing 110, thereby allowing rotation of the display housing 110 about the central axis 111 through the bearings 1302.

With reference to FIG. 15, an electrical block diagram 1500 of the selective call receiver 600, 700, 800 in accordance with the preferred and alternative embodiments of the present invention comprises an antenna 1502 for intercepting RF signals. Preferably, the circuitry utilized in the selective call receiver 600, 700, 800 is conventional and is similar to that of the model A03KLB5962CA ADVISOR® pager manufactured by Motorola, Inc. of Schaumburg, Ill. It will be appreciated that other similar circuitry can be used as well for the selective call receiver 600, 700, 800.

The antenna 1502 is coupled to a receiver 1504 for receiving and demodulating the RF signals intercepted. A decoder 1506 is coupled to the receiver 1504 for decoding a demodulated address transmitted in any of a number of well-known signaling protocols, such as the Post Office Code Standardization Advisory Group (POCSAG) and Golay Sequential Code (GSC) selective call signaling. The microprocessor 108, e.g., the MC68HC05, C08, or C11 series microcomputers manufactured by Motorola, Inc. of Schaumburg, Ill., is also coupled to the receiver 1504 for processing the demodulated information. The microprocessor 108 is responsive to the decoder 1506 and is coupled to a random access memory (RAM) 1510 for storing recovered information having an address assigned to the selective call receiver 600, 700, 800. An alert generator 1512 is coupled to the microprocessor 108 for providing an audible or tactile alert to a user when the microprocessor 1013 has a message ready for presentation.

The display 112 is also controlled by the microprocessor 108. A control section 1516 comprises user accessible controls for allowing the user to command the microprocessor 108 to perform the selective call receiver operations well known to one of ordinary skill in the art, and typically includes control switches such as an on/off control button, a function control, etc.

The microprocessor 108 is coupled to a read-only memory (ROM) 1521 comprising firmware elements for controlling the microprocessor 108. It will be appreciated that the functions of the decoder 1506, the RAM 1510, and the ROM 1521 may be incorporated into the microprocessor 108 as well, as contiguous components thereof. It will be further appreciated that other types of non-volatile memory, e.g., programmable read-only memory (PROM) and electrically-erasable programmable read-only memory (EEPROM), may be used as well for the ROM 1521.

Thus, the present invention provides an apparatus that overcomes the limitations of conventional top-mounted and front-mounted fixed displays. By providing a pivotable display the present invention advantageously allows a user to adjust the position of the display to correspond to top-mounted, front-mounted, or any mounting position therebetween. Also, because the cylinder-shaped, pivotable display preferably makes use of its available internal volume as a battery compartment, the present invention adds minimal volume to a battery operated device for which a battery compartment would be required with or without the pivotable display. The minimal volume added by the present invention is advantageous in devices that often are carried or worn on the person, e.g., a selective call receiver.

In addition, the unique design of the battery compartment includes an aperture for installation and removal of the battery when the pivotable display is rotated to a battery installation and removal position, thus eliminating the need for a separate battery compartment cover and accompanying higher manufacturing costs. Finally, the position retention apparatus in conjunction with the cylindrical exterior shape provided by the present invention minimizes the possibility of inadvertent repositioning of the display during highly active use while being carried or worn on the person, thus minimizing functional compromise of or damage to the pivotable display.

What is claimed is:

1. A pivotable display arrangement for an electronic device including circuitry powered by a battery, the pivotable display arrangement comprising:
   an enclosure for protecting and enclosing the electronic device, the enclosure comprising sides formed to provide an arcuate rectangular aperture spanning across a contiguous portion of top and front enclosure surfaces;
   a pivotable display disposed within the arcuate rectangular aperture, the pivotable display comprising:
   a display element electrically coupled to the circuitry for displaying information provided by the circuitry; and
   a display housing attached to the display element and formed in a substantially cylindrical shape such that an interior portion of the display housing forms a battery compartment for containing the battery; and
   first and second bearing means formed in the enclosure at opposing sides of the arcuate rectangular aperture for rotatably attaching the display housing to the enclosure,
   wherein the first and second bearing means rotatably capture first and second ends of the display housing, thereby allowing rotation of the display housing to a plurality of predetermined positions about a central axis through the first and second bearing means.

2. The pivotable display arrangement of claim 1, wherein a wall of the display housing adjacent to the battery compartment is constructed such that the wall has a substantially rectangular aperture extending lengthwise along the display housing substantially parallel to the central axis and large enough for the battery to pass through, and wherein the enclosure fully encloses the substantially rectangular aperture when the display housing is in a first one of the plurality of predetermined positions intended for viewing the display element, and wherein the enclosure is constructed such that the substantially rectangular aperture is fully exposed when the display housing is in a second one of the plurality of predetermined positions intended for installation and removal of the battery.

3. The pivotable display arrangement of claim 1, wherein the first and second bearing means comprise first and second annular walls formed on the sides of the enclosure to extend over a portion of the first and second ends of the display housing, thereby rotatably capturing the display housing.

4. The pivotable display arrangement of claim 1, wherein the first and second bearing means comprise first and second annular bands formed in the enclosure to extend around corresponding first and second annular depressions formed in the display housing, thereby rotatably capturing the display housing.

5. The pivotable display arrangement of claim 1, wherein the display housing is constructed of a polycarbonate plastic material.

6. The pivotable display arrangement of claim 1, wherein the display element comprises a liquid crystal display device.

7. The pivotable display arrangement of claim 1, wherein the display housing comprises a knurled area surrounding a portion of the display housing for facilitating rotation of the display housing by a user.

8. The pivotable display arrangement of claim 1, further comprising a position retention means coupled between the enclosure and the display housing for retaining one of the plurality of predetermined positions to which the display housing is rotated.

9. The pivotable display arrangement of claim 8, wherein the position retention means comprises:

a plurality of protrusions formed to comprise a knurled band around a portion of the display housing; and a spring-loaded detent coupled between the enclosure and the knurled band for forcibly retaining one of the plurality of predetermined positions to which the display housing is rotated, the plurality of predetermined positions being positions in which the spring-loaded detent is positioned between two of the plurality of protrusions.

10. A selective call receiver powered by a battery, the selective call receiver comprising:

a printed circuit board including circuitry for receiving and decoding selective call messages;

an enclosure coupled to the printed circuit board for protecting and enclosing the circuitry, the enclosure comprising sides formed to provide an arcuate rectangular aperture spanning across a contiguous portion of top and front enclosure surfaces; and a pivotable display disposed within the arcuate rectangular aperture, the pivotable display comprising:

a display element electrically coupled to the circuitry for displaying the selective call messages provided by the circuitry; and a display housing attached to the display element and formed in a substantially cylindrical shape such that an interior portion of the display housing forms a battery compartment for containing the battery; and first and second bearing means formed in the enclosure at opposing sides of the arcuate rectangular aperture for rotatably attaching the display housing to the enclosure, wherein the first and second bearing means rotatably capture first and second ends of the display housing, thereby allowing rotation of the display housing to a plurality of predetermined positions about a central axis through the first and second bearing means.

11. The selective call receiver of claim 10, wherein a wall of the display housing adjacent to the battery compartment is constructed such that the wall has a substantially rectangular aperture extending lengthwise along the display housing substantially parallel to the central axis and large enough for the battery to pass through, and wherein the enclosure fully encloses the substantially rectangular aperture when the display housing is in a first one of the plurality of predetermined positions intended for viewing the display element, and wherein the enclosure is constructed such that the substantially rectangular aperture is fully exposed when the display housing is in a second one of the plurality of predetermined positions intended for installation and removal of the battery.

12. The selective call receiver of claim 10, wherein the first and second bearing means comprise first and second annular walls formed on the sides of the enclosure to extend over a portion of the first and second ends of the display housing, thereby rotatably capturing the display housing.

13. The selective call receiver of claim 10, wherein the first and second bearing means comprise first and second annular bands formed in the enclosure to extend around corresponding first and second annular depressions formed in the display housing, thereby rotatably capturing the display housing.

14. The selective call receiver of claim 10, wherein the display housing is constructed of a polycarbonate plastic material.

15. The selective call receiver of claim 10, wherein the display element comprises a liquid crystal display device.

16. The selective call receiver of claim 10, wherein the display housing comprises a knurled area surrounding a portion of the display housing for facilitating rotation of the display housing by a user.

17. The selective call receiver of claim 10, further comprising a position retention means coupled between the enclosure and the display housing for retaining one of the plurality of predetermined positions to which the display housing is rotated.

18. The selective call receiver of claim 17, wherein the position retention means comprises:

a plurality of protrusions formed to comprise a knurled band around a portion of the display housing; and a spring-loaded detent coupled between the enclosure and the knurled band for forcibly retaining one of the plurality of predetermined positions to which the display housing is rotated, the plurality of predetermined positions being positions in which the spring-loaded detent is positioned between two of the plurality of protrusions.

19. A pivotable display arrangement for an electronic device including circuitry powered by a battery, the pivotable display arrangement comprising:

an enclosure for protecting and enclosing the electronic device, the enclosure having sides formed to provide an arcuate rectangular aperture spanning across a contiguous portion of top and front enclosure surfaces;

a pivotable display disposed within the arcuate rectangular aperture, the pivotable display comprising:

a display element electrically coupled to the circuitry for displaying information provided by the circuitry; and a display housing attached to the display element and formed in a substantially cylindrical shape such that an interior portion of the display housing forms a battery compartment for containing the battery; and first and second bearing means formed in the enclosure at opposing sides of the arcuate rectangular aperture for rotatably attaching the display housing to the enclosure, wherein the first and second bearings rotatably capture first and second ends of the display housing, thereby allowing rotation of the display housing to a plurality of predetermined positions about a central axis through the first and second bearings.

* * * * *